United States Patent
Hendrickson et al.

(10) Patent No.: US 10,557,527 B2
(45) Date of Patent: Feb. 11, 2020

(54) WIDE-NODE DRIVE SYSTEM

(71) Applicant: GM GLOBAL TECHNOLOGY OPERATIONS LLC, Detroit, MI (US)

(72) Inventors: James D. Hendrickson, Oxford, MI (US); Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 15/647,926

(22) Filed: Jul. 12, 2017

(65) Prior Publication Data

US 2019/0017578 A1    Jan. 17, 2019

(51) Int. Cl.
| | |
|---|---|
| *F16H 3/72* | (2006.01) |
| *B60K 6/365* | (2007.10) |
| *B60K 6/445* | (2007.10) |
| *F16H 7/08* | (2006.01) |
| *F16H 37/08* | (2006.01) |

(52) U.S. Cl.
CPC ............. *F16H 3/727* (2013.01); *B60K 6/365* (2013.01); *B60K 6/445* (2013.01); *F16H 2007/0812* (2013.01); *F16H 2037/0866* (2013.01); *F16H 2200/201* (2013.01); *F16H 2200/202* (2013.01); *F16H 2200/2064* (2013.01)

(58) Field of Classification Search
CPC . B60K 6/365; B60K 6/445; F16H 2007/0812; F16H 2037/0866; F16H 2200/201; F16H 2200/202; F16H 2200/2064; F16H 3/727
See application file for complete search history.

(56) References Cited

U.S. PATENT DOCUMENTS

| | | | | |
|---|---|---|---|---|
| 7,367,911 | B2 * | 5/2008 | Raghavan | B60K 6/365 180/65.25 |
| 2006/0111213 | A1 * | 5/2006 | Bucknor | B60L 50/61 475/5 |
| 2006/0240929 | A1 * | 10/2006 | Raghavan | B60K 6/365 475/5 |
| 2007/0225097 | A1 * | 9/2007 | Raghavan | B60K 6/365 475/5 |
| 2007/0275814 | A1 * | 11/2007 | Bucknor | B60K 6/365 475/275 |

(Continued)

*Primary Examiner* — Jacob S. Scott
(74) *Attorney, Agent, or Firm* — Quinn IP Law

(57) ABSTRACT

An electro-mechanical drive unit connectable with first and second motor/generators includes an output member, a stationary member, a gear-train, and a torque-transmitting device. The drive unit also includes a compound planetary gear arrangement having a ring gear structure, first and second sun gears, and a carrier structure. The gear arrangement includes first, second, third, and fourth junction points and has a double-pinion assembly having a first pinion gear in mesh with the first sun gear member and a second pinion gear in mesh with the first pinion gear and with the ring gear structure. The gear arrangement is operatively connected to the second motor/generator at the first junction point via the gear-train and to the first motor/generator at the fourth junction point. The output member is operatively connected to the second junction point. Furthermore, the torque-transmitting device is engageable to ground the third junction point to the stationary member.

19 Claims, 5 Drawing Sheets

(56) References Cited

U.S. PATENT DOCUMENTS

| | | | |
|---|---|---|---|
| 2014/0100071 A1* | 4/2014 | Kimes | B60K 1/02 475/5 |
| 2015/0005127 A1* | 1/2015 | Lee | B60K 6/365 475/5 |

* cited by examiner

WIDE-NODE DRIVE SYSTEM

INTRODUCTION

The disclosure relates to a wide-node drive unit for a motor vehicle.

To produce a more efficient vehicle, hybrid vehicle powertrains combine an electric motor and an internal combustion engine. Torque from the engine and the electric motor is typically channeled to the vehicle's driven wheels via a transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor-generators and no internal combustion engine.

In either a hybrid or purely electric powertrain, the electric motors are operatively connected to a transmission which generally includes planetary gearing such that torque and speed of the electric motors may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motors, and, in the case of the hybrid powertrain, may similarly provide a selectable torque contribution from the engine to drive the subject vehicle.

SUMMARY

An electro-mechanical drive unit connectable with multiple power sources for launching and propelling a vehicle includes an output member, a stationary member, a gear-train, and a torque-transmitting device. The drive unit also includes a compound planetary gear arrangement having a ring gear structure, first and second sun gear members, and a carrier structure. The compound planetary gear arrangement also includes a double-pinion assembly having a first pinion gear in mesh with the first sun gear member and a second pinion gear in mesh with the first pinion gear and with the ring gear structure. The compound planetary gear arrangement additionally includes first, second, third, and fourth junction points. The power sources include a first motor/generator and a second motor/generator. The gear arrangement is configured to be operatively connected to the second motor/generator at the first junction point via the gear-train and to the first motor/generator at the fourth junction point. The output member is operatively connected to the second junction point. Furthermore, the torque-transmitting device is engageable to ground the third junction point to the stationary member.

In such an electro-mechanical drive unit, the first sun gear member may define the first junction point, the ring gear structure may define the second junction point, the carrier structure may define the third junction point, and the second sun gear member may define the fourth junction point.

In one embodiment, the compound planetary gear arrangement may include first and second planetary gear sets. In such an embodiment, the carrier structure may include a first carrier member interconnected with a second carrier member, the ring gear structure may include a first ring gear member interconnected with a second ring gear member. Furthermore, the first planetary gear set may include the first ring gear member, the first carrier member, the first pinion gear, the second pinion gear, and the first sun gear member, while the second planetary gear set may include the second ring gear member, the second carrier member, a third pinion gear, and the second sun gear member.

In an alternative embodiment, the compound planetary gear arrangement may be configured as a Ravigneaux planetary gear set. In such an embodiment, the ring gear structure may be defined by a single ring gear member, the carrier structure may be defined by a single carrier member, and the second pinion gear may be in mesh with the second sun gear member.

The first, second, third, and fourth junction points may provide at least a 3 to 1 gear ratio spread between the torque-transmitting device and the output member. The highest numerical gear ratio in the drive unit may be approximately 4 to 1 and the lowest numerical gear ratio may be approximately 0.7 to 1.

The first motor/generator may be disposed on a first rotating axis and the second motor/generator may be disposed on a second rotating axis, wherein the first axis may be parallel to the second axis. Specifically, the drive unit may also include an input member arrangement. In such a case, the input member arrangement may include a rotor of the first motor/generator and a rotor of the second motor/generator. The rotor of the first motor/generator may be disposed on the first rotating axis, and the rotor of the second motor/generator is disposed on the second rotating axis.

The power sources may additionally include an internal combustion engine. In such a case, the engine may be disposed on the first rotating axis and operatively connected to the compound planetary gear arrangement at the third junction point.

The torque-transmitting device may be selectively engaged and disengaged via an electrically actuated device. Additionally, the torque-transmitting device may be one of a band, a roller-ramp, a dog clutch, and a sprag type of a brake. Accordingly, if the stationary member is a housing of the electro-mechanical drive unit, the torque-transmitting device may be used to brake the third junction point relative to the housing.

The second motor/generator may be configured to generate greater torque and be physically larger than the first motor/generator. Additionally, the first motor/generator and the second motor/generator may employ non-rare earth magnets.

The drive unit may additionally include a first hydraulic pump and a second hydraulic pump. In such a case, the first pump may be operatively connected to the third junction point and the second pump may be operatively connected to the output member.

Such a drive unit in conjunction with the engine, the first motor/generator and the second motor/generator may be part of a hybrid powertrain having the EVT that is configured to provide a single-mode wide-node gear ratio spread configuration to launch and propel the vehicle.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
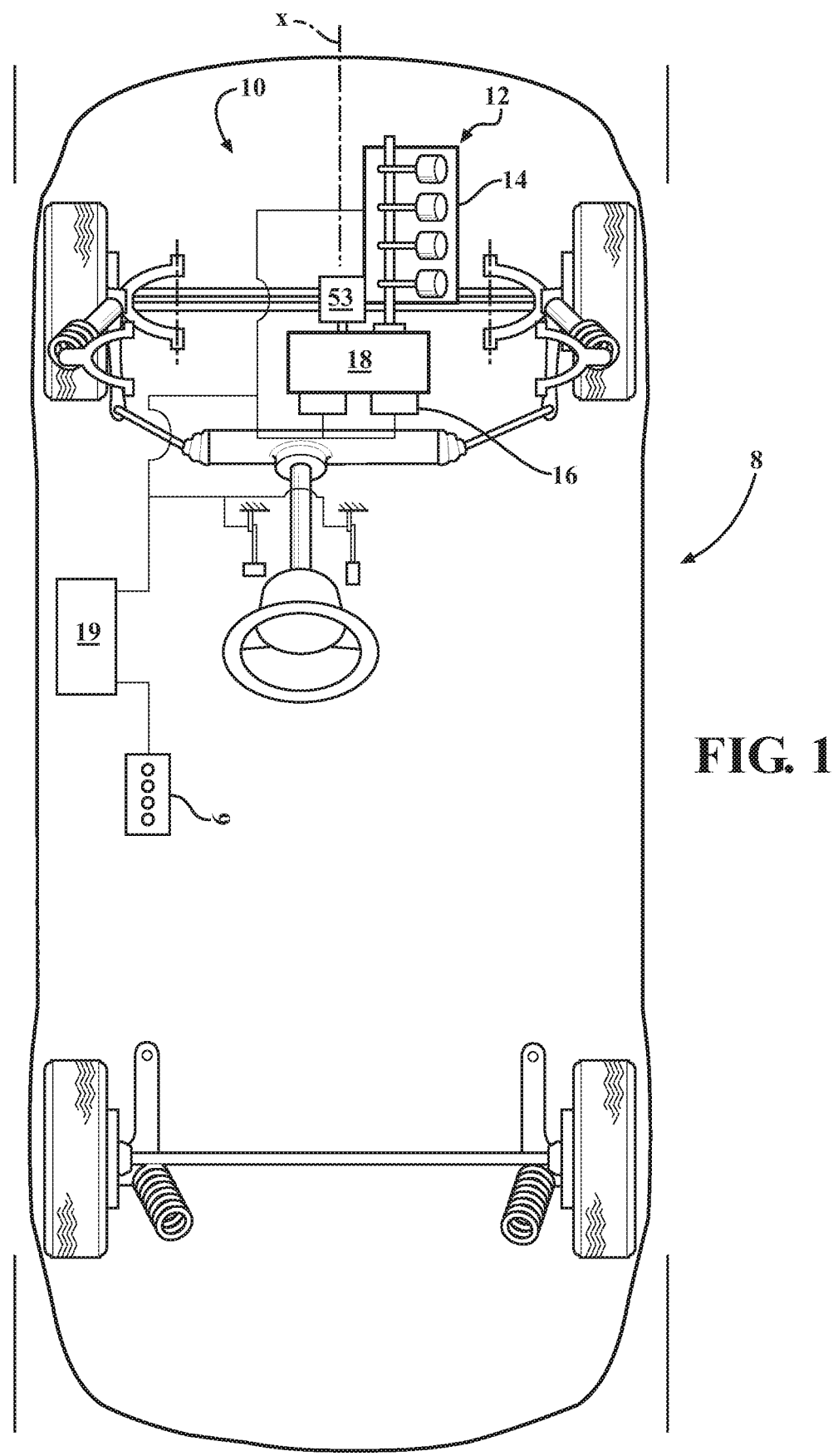
FIG. 1 is a schematic illustration of a vehicle having a wide-node compound-split electrically variable transmission (EVT) employed as part of a hybrid powertrain.

Referring to the drawings, wherein like reference numbers refer to like components, FIG. 1 illustrates a vehicle 8 equipped with a hybrid powertrain 10. The hybrid powertrain 10 is configured to launch and propel the vehicle 8, i.e., to operate the vehicle in various speed ranges between low and high road speeds. The hybrid powertrain 10 includes multiple power sources, which include an internal combustion engine 12, a first electric motor/generator 14, and a second electric motor/generator 16, each connected to an electro-mechanical drive unit that is depicted as an "electrically variable transmission" (EVT) 18.

The powertrain 10 additionally has an energy storage system that includes one or more batteries generally depicted via numeral 9. The energy storage system 9 is operatively connected to the first and second motor/generators 14, 16, such that the motor/generators may transfer torque to or receive torque from the engine 12. The powertrain 10 may also include a controller or an electronic control unit (ECU) 19. As shown, the controller 19 is operatively connected to the power sources 12, 14, 16 and to the energy storage system 9 to control the distribution of torque from the power sources to the EVT 18.

An "electrically variable transmission" constitutes a transmission planetary gear train operatively connected to each of the engine 12, the first motor/generator 14, and the second motor/generator 16. Channeling respective torques of the engine 12 and the two motor/generators 14 and 16 to different members of the planetary gear train permits one of the power sources to either assist or balance the operation of one or both of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently.

Although the hybrid powertrain 10 as shown includes the engine 12, the EVT 18 may also be connectable solely to the first and second electric motor/generators 14, 16. In such a case, the powertrain 10 would no longer be a hybrid type, but would become purely electric, and the EVT 18 may then be broadly described as an electro-mechanical drive unit. For simplicity and clarity, the remainder of the present description will refer to the electro-mechanical drive unit as EVT 18 being connected to the engine 12, as well as to the motor/generators 14, 16. Additionally, the connections of the hybrid powertrain 10, to be described in greater detail below, may permit an overall decrease in torque requirement from the combination of the first and the second motor/generators 14 and 16 while affording acceptable vehicle performance, as compared with other systems.

Figure 2:
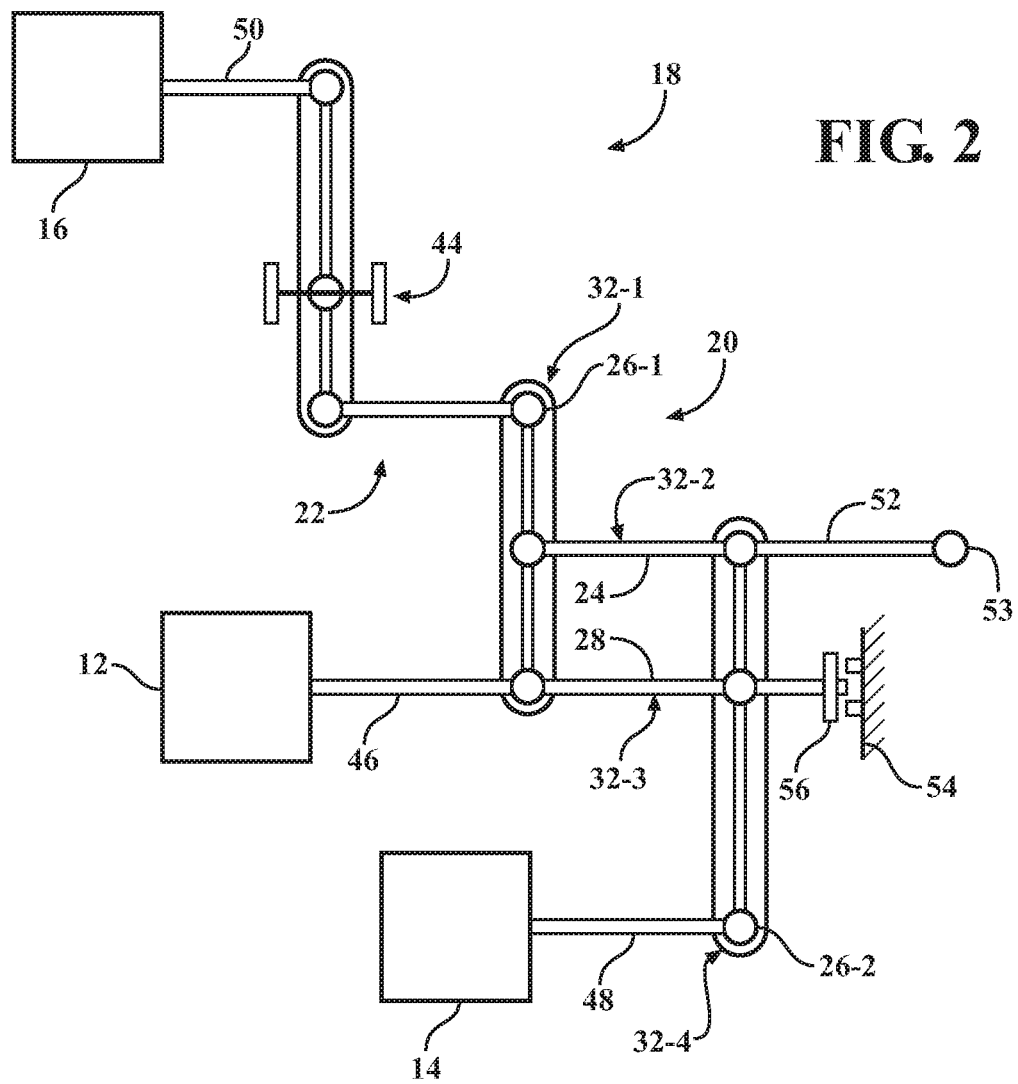
FIG. 2 is a schematic lever diagram illustration of the wide-node compound-split EVT shown in FIG. 1.

The EVT 18 includes a compound-split planetary gear arrangement 20 represented in lever diagram form in FIG. 2. A lever diagram is a schematic representation of the components of a mechanical device such as an automatic transmission. Each individual lever may represent an individual planetary gear set, a compound planetary gear arrangement having two or more interconnected planetary gear sets, or an external gear set. In the planetary gear set lever, the three basic mechanical components of the subject gear set, i.e., the sun gear, planet gear carrier, and ring gear members, are each represented by a junction point on the particular lever. Therefore, a typical single planetary gear set lever contains three junction points: one for the sun gear member, one for the planet gear carrier member, and one for the ring gear member. The relative length between the junction points of each planetary gear set lever may be used to represent the ring-to-sun gear ratio of each respective gear set. These lever ratios, in turn, are used to vary the gear ratios of the transmission in order to achieve appropriate ratios and ratio progression. Mechanical couplings or interconnections between the junction points of the various planetary gear sets are illustrated by thin horizontal lines and torque transmitting devices, such as clutches and brakes, which are presented as interleaved fingers. If the device is a brake, one set of the fingers is grounded. Further explanation of the format, purpose and use of lever diagrams may be found in SAE Paper 810102, authored by Benford, Howard and Leising, Maurice, "The Lever Analogy: A New Tool in Transmission Analysis" (1981), which is hereby fully incorporated by reference.

A four-junction point lever 22, as defined by the compound-split planetary gear arrangement 20, is shown in FIG. 2. In general, a four-junction point lever is established by providing two separate fixed connections, i.e., pairings, between a member of one planetary gear set and a member of another planetary gear set. Such fixed connections may, for example, be provided between a planet carrier of one gear set and a ring gear of another gear set, or between a planet carrier of one gear set and a sun gear of another. When a single such fixed connection is employed, the subject connection serves to reduce the maximum number of separately rotating inertias (about a common central axis) from six to four, and the total degrees of freedom from four to two. Thus constrained, the compound-split planetary gear arrangement 20 provides, in order of rotational speed, first, second, third, and fourth junction points. However, as understood by those skilled in the art, various compound planetary gear arrangements may be constructed to provide a four-junction point lever that will accomplish such a result, and place them within the scope of the lever diagram of FIG. 2.

As may be seen in FIG. 2, the lever 22 representing the compound-split planetary gear arrangement 20 includes a ring gear structure 24, a first sun gear member 26-1, a second sun gear member 26-2, a carrier structure 28, and a double-pinion assembly. The carrier structure 28 is configured to support the double-pinion assembly. Specifically, the double-pinion assembly has a first pinion gear in mesh with the first sun gear member. The double-pinion assembly also has a second pinion gear in mesh with the first pinion gear and with the ring gear structure 24. The double-pinion assembly will be discussed in detail below with respect to specific embodiments of the compound-split planetary gear arrangement 20 shown in FIGS. 3 and 4. As may also be seen in FIG. 2, the lever 22 representing the compound-split planetary gear arrangement 20 includes a first, second, third, and fourth junction points 32-1, 32-2, 32-3, and 32-4, respectively. Accordingly, the compound-split planetary gear arrangement 20 operatively includes the respective first, second, third, and fourth junction points 32-1, 32-2, 32-3, and 32-4. The first junction point 32-1 represents or is defined by the first sun gear member 26-1, the second junction point 32-2 is defined by the ring gear structure 24, the third junction point 32-3 is defined by the carrier structure 28, and the fourth junction point 32-4 is defined by the second sun gear member 26-2. As shown in stick diagram format and described below with respect to FIGS. 3 and 4, the junction points 32-2 and 32-3 are represented by fixed interconnections, such that the resultant structure effectively generates a four-junction point lever. Accordingly, the stick diagrams FIGS. 3 and 4 of the EVT 18 represent specific compound-split planetary gear arrangements that correspond to and are reflected by the EVT 18 depicted by the lever diagram of FIG. 2.

Figure 3:
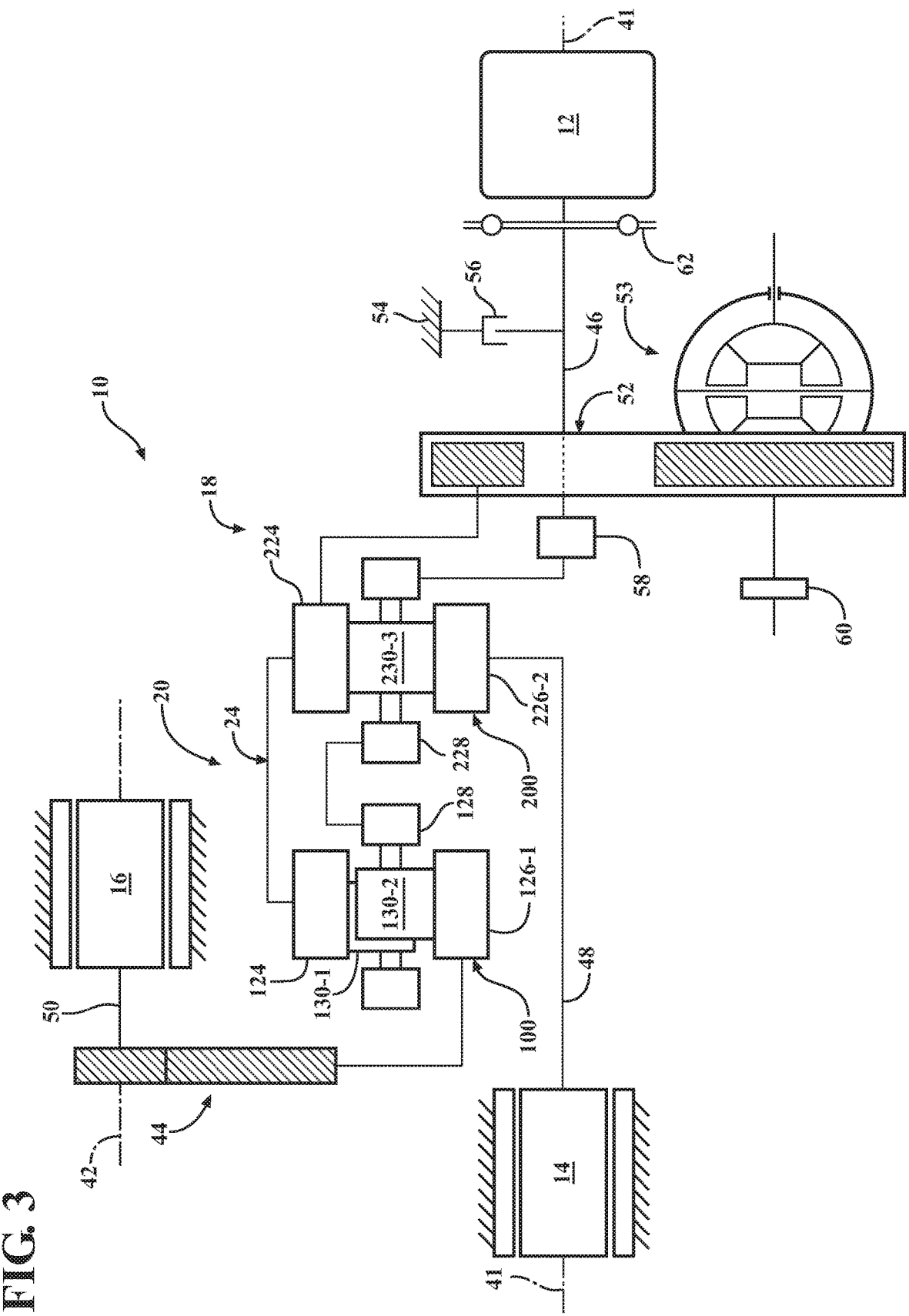
FIG. 3 is a stick diagram illustration of an embodiment of the wide-node compound-split EVT presented in lever diagram form in FIG. 2.

In a specific embodiment shown in FIG. 3, the compound-split planetary gear arrangement 20 includes a first planetary gear set 100 and second planetary gear set 200. In the present embodiment, the carrier structure 28 includes a first carrier member 128 interconnected with a second carrier member 228. Additionally, the ring gear structure 24 includes a first ring gear member 124 interconnected with a second ring gear member 224. The first planetary gear set 100 includes the first ring gear member 124, the first carrier member 128, and a first sun gear member 126-1, which is a specific embodiment of the first sun gear member 26-1 shown in FIG. 2. The first planetary gear set 100 is also configured as a double-pinion assembly that includes a first set of pinion gears 130-1 and a second set of pinion gears 130-2, which are respective embodiments of the first pinion gear 30-1 and the second pinion gear 30-2 shown in FIG. 2. As shown, the first carrier member 128 is configured to support the first and second sets of pinion gears 130-1, 130-2. As may also be seen in FIG. 3, the first set of pinion gears 130-1 is in mesh with the first sun gear member 126-1, while the second set of pinion gears 130-2 is in mesh with the first set of pinion gears and with the first ring gear member 124.

The second planetary gear set 200 includes the second ring gear member 224, the second carrier member 228, a third set of pinion gears 230-3, and a second sun gear member 226-2, which is a specific embodiment of the second sun gear member 26-2 shown in FIG. 2. As shown in FIG. 3, the third set of pinion gears 230-3 is supported by the second carrier member 228. The third set of pinion gears 230-3 is in mesh with each of second ring gear member 224 and the second sun gear member 226-2. Each of the first, second, and third sets of pinion gears 130-1, 130-2, and 230-3 includes at least three individual pinion gears appropriately configured to affect the above meshed connections. Overall, the above described interconnections of the first planetary gear set 100 and second planetary gear set 200 provide a respective decomposition of the compound-split planetary gear arrangement 20 and are, therefore, represented by the four-junction point lever 22 shown in FIG. 2.

Figure 4:
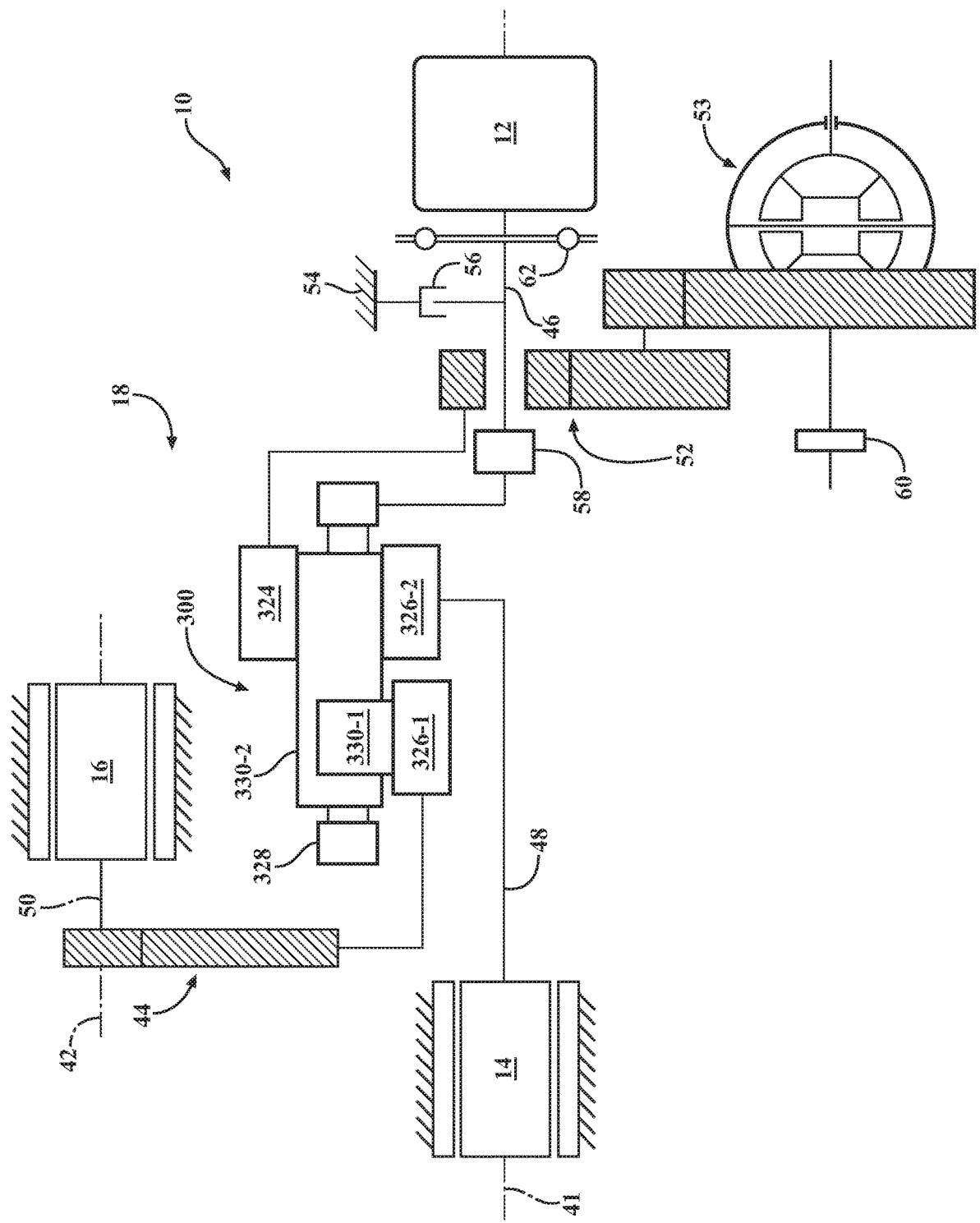
FIG. 4 is a stick diagram illustration of another embodiment of the wide-node compound-split EVT presented in lever diagram form in FIG. 2.

In a specific embodiment shown in FIG. 4, the compound-split planetary gear arrangement 20 is configured as a Ravigneaux planetary gear set 300. In general, a Ravigneaux planetary gear-set is constructed from two meshed gear pairs—a ring gear member/planetary gear pair and a planetary gear/sun gear pair. The Ravigneaux planetary gear-set has a single planet carrier member holding two sets of planetary gears—inner planetary gears and outer planetary gears. The planet carrier member is a single sub-assembly that supports the inner and outer planetary gears on distinct, respective inner and outer pitch circles. The two sets of planetary gears are in mesh and therefore co-rotate with a fixed gear ratio with respect to each other, but independently of the carrier.

In the Ravigneaux planetary gear set 300, the ring gear structure 24 is defined by a single ring gear 324, and the carrier structure 28 is defined by a single carrier member 328. The Ravigneaux planetary gear set 300 also includes a first sun gear member 326-1 and second sun gear member 326-2, which are, respectively, specific embodiments of the first sun gear member 26-1 and the second sun gear member 26-2 shown in FIG. 2. In the Ravigneaux planetary gear set 300, the carrier member 328 supports the double-pinion assembly having a first set of pinion gears 330-1 and a second set of pinion gears 330-2, which are specific respective embodiments of the first pinion gear 30-1 and the second pinion gear 30-2 shown in FIG. 2.

Each of the first and second sets of pinion gears 330-1 and 330-2 includes at least three individual pinion gears appropriately configured to affect the above meshed connections. As may be seen in FIG. 4, The first set of pinion gears 330-1 is in mesh with the first sun gear member 326-1, while the second set of pinion gears 330-2 is in mesh with the first set of pinion gears, with the second sun gear member 326-2, and with the ring gear 324. Facilitating such an arrangement, each individual gear of the second set of pinion gears 330-2 is a long pinion gear that spans the longitudinal distance between the first and the second sun gear members 326-1, 326-2. Accordingly, the Ravigneaux planetary gear set 300 decomposition of the compound-split planetary gear arrangement 20 is represented by the four-junction point lever 22 shown in FIG. 2.

As shown in each of FIGS. 3 and 4, the engine 12 and the first motor/generator 14 are disposed on a common first rotating axis 41 and the second motor/generator is disposed on a second rotating axis 42, wherein the first axis is substantially parallel to the second axis. The EVT 18 additionally includes a gear-train 44. The gear-train 44 is configured to operatively connect the second motor/generator 16 to the compound-split planetary gear arrangement 20 at the first junction point 32-1. The gear-train 44 may be configured as either a single-stage or a two-stage parallel shaft gear set.

With specific reference to FIG. 2, the engine 12, the first motor/generator 14, and the second motor/generator 16 are operatively connected to the EVT 18 via an input member arrangement, which transmits torque from the power sources to the compound-split planetary gear arrangement 20. The input member arrangement includes an output shaft of the engine 12, which serves as an input member 46; a rotor of the first motor/generator 14, which serves as an input member 48; and a rotor of the second motor/generator 16, which serves as an input member 50. The input member 46 is configured to provide engine torque to the EVT 18. The input member 48 and input member 50 are each configured to provide torque from the first motor/generator 14 and the second motor/generator 16, respectively, to the EVT 18. Specifically, as shown, the input member 46 and the input member 48 are disposed on the first rotating axis 41, while the input member 50 is disposed on the second rotating axis 42.

As may be seen in FIG. 2, the input member 46 is continuously connected to the third junction point 32-3, the input member 48 is continuously connected to the fourth junction point 32-4, and the input member 50 is continuously connected to the first junction point 32-1. The EVT 18 also includes an output member 52. The output member 52 is continuously connected to the second junction point 32-2 and is configured to provide output torque from the compound-split planetary gear arrangement 20 for launching and propelling the vehicle. As shown in FIG. 2, the output member 52 may be configured as a chain drive member (shown in FIG. 3) that connects the carrier member 30 to a differential unit 53. The output member 52 may also be configured as a gear drive (shown in FIG. 4).

As may be seen in FIGS. 2-4, the EVT 18 also includes a stationary member such as a transmission case or housing 54. The third junction point 32-3 is selectively connectable with the housing 54 via an engageable torque-transmitting device 56, to thereby ground the junction point 32-3. The torque-transmitting device 56 may be selectively engaged and disengaged via an electrically actuated device, such as a solenoid. Additionally, the torque-transmitting device 56 may be configured either as a band, a roller-ramp one-way-clutching, a dog clutch, or a sprag type of a brake. Accordingly, the torque-transmitting device 56 may be used to brake the third junction point 32-3 relative to the housing 54. The electrically actuated torque-transmitting device 56 permits reduced efficiency losses in the hybrid powertrain 10, as well as in a purely electric powertrain application, i.e., sans the engine 12. Additionally, the electrically actuated torque-transmitting device 56 enables increased drive torque capability for the purely electric powertrain application.

A particular benefit of the described arrangement of the first, second, third, and fourth junction points 32-1, 32-2, 32-3, 32-4 of the EVT 18 is that the subject EVT is capable of providing a wide-node gear ratio spread, as shown by the graph shown in FIG. 5 and which will be described in greater detail below. As employed herein, the concept of "node width" represents the distance traveled by the vehicle per each revolution of the engine 12, and the term "wide-node" is indicative of the distance traveled by a vehicle employing the EVT 18 as compared to a vehicle employing a typical single-mode EVT.

Figure 5:
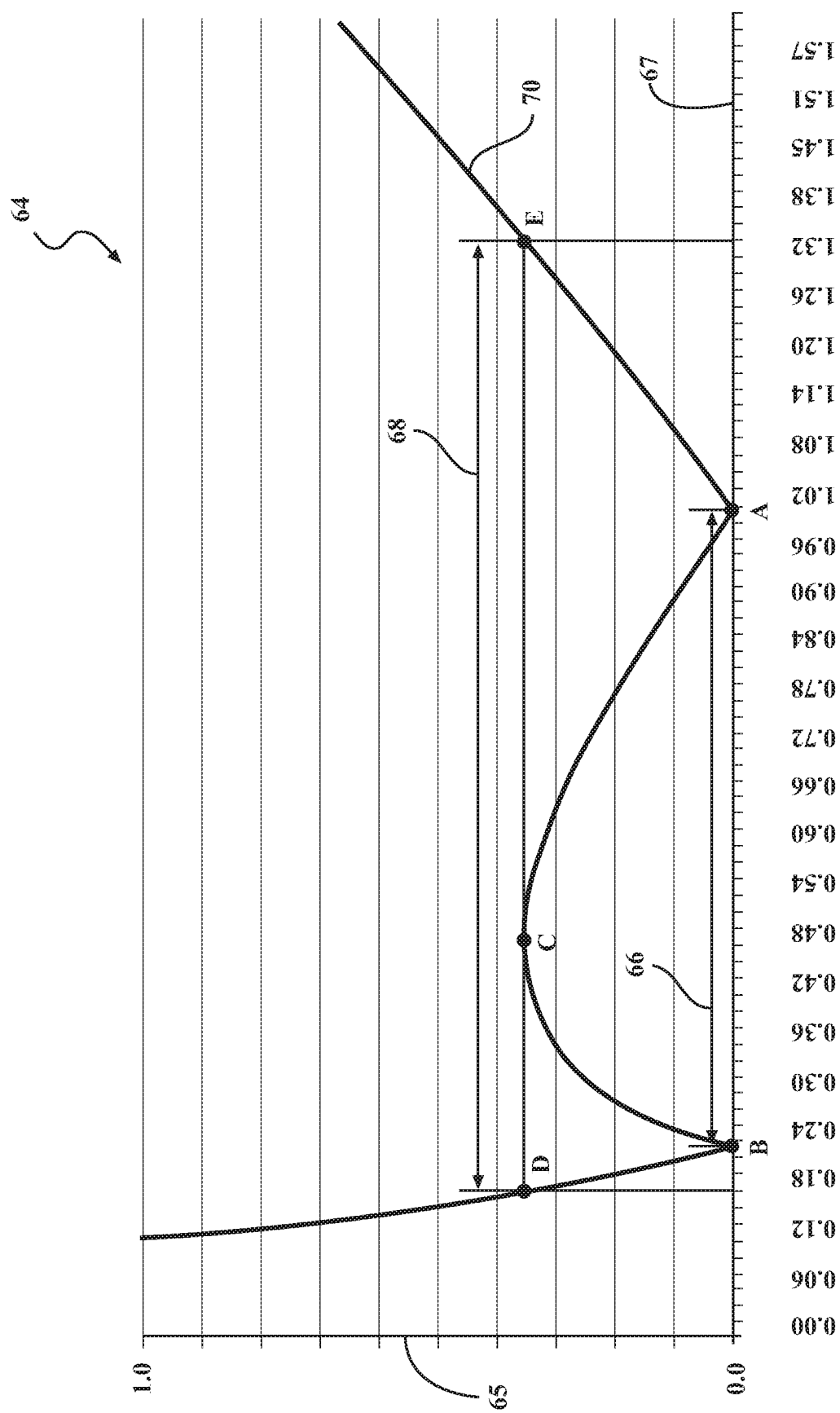
FIG. 5 is a graph illustrating a comparison of vehicle distance traveled per engine revolution for the wide-node EVTs shown in FIGS. 1-4.

FIG. 5 shows a graph 64 of exemplary electrical power path magnitude as a fraction of engine power used to drive the vehicle versus the vehicle distance traveled per engine revolution in meters traced by a curve 70. The electrical power path magnitude is shown on the Y-axis of the graph 64 and is represented by numeral 65, while the vehicle distance traveled per engine revolution is shown on the X-axis of the graph and is represented by numeral 67. Additionally, the graph 64 compares node widths of exemplary embodiments of the EVT 18 which are represented by a distance 66 between mechanical points or nodes identified by letters A and B and a distance 68 between points identified by letters D and E plotted on the curve 70. In a specific example, the distance 66 traveled by the vehicle per each revolution of the engine 12 with the EVT 18, when electric power path (from the first and second motor/generators 14, 16) is zero, exceeds approximately 0.8 meters. As shown, for the same configuration, the distance 68 traveled by the vehicle per each revolution of the engine 12 when electric power from the first and second motor/generators 14, 16 is approximately equal to a fraction of engine power identified by letter C and exceeds 1.2 meters. By comparison, in a typical single-mode compound-split EVT the distance 66 is generally around 0.5 meters, while also having the distance 68 of under of 1.2 meters. Accordingly, the greater distance 66 for the EVT 18 than for a typical representative single-mode compound-split EVT identifies the EVT 18 as having a wider-node gear ratio spread.

As a result, the EVT 18 is capable of providing at least a 3 to 1 gear ratio spread between the torque-transmitting device 56 (i.e., the input member 46) and the output member 52 (i.e., the either of the ring gear members 224 or 334). Furthermore, the highest numerical gear ratio of the EVT 18 having such an arrangement of the first, second, third, and fourth junction points 32-1, 32-2, 32-3, 32-4 may have approximately 4 to 1 as its highest numerical gear ratio and approximately 0.7 to 1 as its lowest numerical gear ratio. As a result, the first motor/generator 14 may be sized differently, i.e., be physically smaller, than the second motor/generator 16. Accordingly, the first motor/generator 14 may be configured to generate less torque than the second motor/generator 16. Additionally, each of the first and second motor/generators 14, 16 may be configured with solid cores and employ non-rare earth magnets which are significantly more ubiquitous and less expensive than rare earth type.

As shown in FIG. 2, the EVT 18 also includes a first hydraulic pump 58 and a second hydraulic pump 60. The first and the second hydraulic pumps 58, 60 are configured to supply pressurized fluid to lubricate the compound-split planetary gear arrangement 20, as well as the engine 12 and the first and second motor/generators 14, 16. As shown, the first pump 58 is operatively connected to the third junction point 32-3 and the second pump 60 is operatively connected to the output member 52, however, the positions of the two pumps may be interchanged. The EVT 18 also includes a damper 62. The damper 62 is operatively connected to the engine 12 and is configured to absorb torsional vibrations generated by the engine before such vibrations may be transmitted to the compound-split planetary gear arrangement 20 via the input member 46.

The preceding configuration of the EVT 18 is a cost effective single-mode compound-split electro-mechanical drive unit that embodies advantages of a two-mode system that provides a first mode for launching a vehicle from rest and a separate second mode for propelling the subject vehicle at higher speeds, but eschews the two-mode system's mechanical and controls complexity. Accordingly, the EVT 18 is a single-mode compound-split electro-mechanical drive unit that enables sufficient torque to be generated and channeled for launching and propelling the vehicle, as well as supports an engine stop-start function. Additionally, the EVT 18 is capable of providing reduced losses in operating efficiency of the powertrain 10 during both drive and electric regeneration of the vehicle's energy storage system operating modes. Moreover, because the EVT 18 is an off-axis layouts, i.e., has the engine 12 and the motor/generator 14 disposed on the first rotating axis 41 while the motor/generator 16 is disposed on the second rotating axis 42, the EVT 18 is particularly suitable to front-wheel-drive vehicle applications, where the powertrain 10 is situated substantially transversely with respect to longitudinal axis of the subject vehicle.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electro-mechanical drive unit connectable with multiple power sources including first and second motor/generators for launching and propelling a vehicle, comprising:
    an output member;
    a stationary member;
    a gear-train;
    a torque-transmitting device;
    a compound planetary gear arrangement having a ring gear structure, a first sun gear member, a second sun gear member, a carrier structure, and a double-pinion assembly having a first pinion gear in mesh with the first sun gear member and a second pinion gear in mesh with the first pinion gear and with the ring gear structure; and
    a first hydraulic pump and a second hydraulic pump;
    wherein:
        the compound planetary gear arrangement includes a first junction point, a second junction point, a third junction point, and a fourth junction point;
        the compound planetary gear arrangement is configured to be operatively connected to the second motor/generator at the first junction point via the gear-train and to the first motor/generator at the fourth junction point;
        the output member is operatively connected to the compound planetary gear arrangement at the second junction point;
        the torque-transmitting device is engageable to ground the third junction point to the stationary member; and
        the first pump is operatively connected to the third junction point and the second pump is operatively connected to the output member.

2. The electro-mechanical drive unit according to claim 1, wherein:
    the first sun gear member defines the first junction point;
    the ring gear structure defines the second junction point;
    the carrier structure defines the third junction point; and
    the second sun gear member defines the fourth junction point.

3. The electro-mechanical drive unit according to claim 2, wherein:
    the compound planetary gear arrangement includes first and second planetary gear sets;
    the carrier structure includes a first carrier member interconnected with a second carrier member;
    the ring gear structure includes a first ring gear member interconnected with a second ring gear member;
    the first planetary gear set includes the first ring gear member, the first carrier member, the first pinion gear, the second pinion gear, and the first sun gear member; and
    the second planetary gear set includes the second ring gear member, the second carrier member, a third pinion gear, and the second sun gear member.

4. The electro-mechanical drive unit according to claim 2, wherein:
    the compound planetary gear arrangement is configured as a Ravigneaux planetary gear set;
    the ring gear structure is defined by a single ring gear member;
    the carrier structure is defined by a single carrier member; and
    the second pinion gear is in mesh with the second sun gear member.

5. The electro-mechanical drive unit according to claim 1, wherein the first, second, third, and fourth junction points provide at least a 3 to 1 gear ratio spread between the torque-transmitting device and the output member.

6. The electro-mechanical drive unit according to claim 1, further comprising an input member arrangement, wherein:
    the input member arrangement includes a rotor of the first motor/generator and a rotor of the second motor/generator;
    the rotor of the first motor/generator is disposed on a first rotating axis and the rotor of the second motor/generator is disposed on a second rotating axis; and
    the first axis is parallel to the second axis.

7. The electro-mechanical drive unit according to claim 6, wherein the multiple power sources additionally include an internal combustion engine disposed on the first rotating axis and operatively connected with the compound planetary gear arrangement at the third junction point.

8. The electro-mechanical drive unit according to claim 1, wherein the torque-transmitting device is selectively engaged and disengaged via an electrically actuated device.

9. The electro-mechanical drive unit according to claim 1, wherein the torque-transmitting device is one of a band brake, a roller-ramp brake, a dog clutch, and a sprag brake.

10. A hybrid powertrain for launching and propelling a vehicle, comprising:
    an engine;
    a first motor/generator;
    a second motor/generator;
    a first hydraulic pump and a second hydraulic pump; and
    a single-mode wide-ratio gear ratio spread electrically-variable transmission having:
        an output member;
        a stationary member;
        a gear-train;
        a torque-transmitting device; and
        a compound planetary gear arrangement having a ring gear structure, a first sun gear member, a second sun gear member, a carrier structure, and a double-pinion assembly having a first pinion gear in mesh with the first sun gear member and a second pinion gear in mesh with the first pinion gear and with the ring gear structure;
    wherein:
        the compound planetary gear arrangement includes a first junction point, a second junction point, a third junction point, and a fourth junction point;
        the second motor/generator is operatively connected to the compound planetary gear arrangement at the first junction point via the gear-train;
        the output member is operatively connected to the compound planetary gear arrangement at the second junction point;
        the engine is operatively connected to the compound planetary gear arrangement at the third junction point;
        the first motor/generator is operatively connected to the compound planetary gear arrangement at the fourth junction point;
        the torque-transmitting device is engageable to ground the third junction point to the stationary member; and
        the first pump is operatively connected to the third junction point and the second pump is operatively connected to the output member.

11. The hybrid powertrain according to claim 10, wherein:
the first sun gear member defines the first junction point;
the ring gear structure defines the second junction point;
the carrier structure defines the third junction point; and
the second sun gear member defines the fourth junction point.

12. The hybrid powertrain according to claim 11, wherein:
the compound planetary gear arrangement includes first and second planetary gear sets;
the carrier structure includes a first carrier member interconnected with a second carrier member;
the ring gear structure includes a first ring gear member interconnected with a second ring gear member;
the first planetary gear set includes the first ring gear member, the first carrier member, the first pinion gear, the second pinion gear, and the first sun gear member; and
the second planetary gear set includes the second ring gear member, the second carrier member, a third pinion gear, and the second sun gear member.

13. The hybrid powertrain according to claim 11, wherein:
the compound planetary gear arrangement is configured as a Ravigneaux planetary gear set;
the ring gear structure is defined by a single ring gear member;
the carrier structure is defined by a single carrier member; and
the second pinion gear is in mesh with the second sun gear member.

14. The hybrid powertrain according to claim 10, wherein the first, second, third, and fourth junction points provide at least a 3 to 1 gear ratio spread between the torque-transmitting device and the output member.

15. The hybrid powertrain according to claim 10, wherein the first motor/generator and the engine are disposed on a first rotating axis and the second motor/generator is disposed on a second rotating axis, and wherein the first axis is parallel to the second axis.

16. The hybrid powertrain according to claim 10, wherein the torque-transmitting device is selectively engaged and disengaged via an electrically actuated device.

17. The hybrid powertrain according to claim 10 wherein the torque-transmitting device is one of a band brake, a roller-ramp brake, a dog clutch, and a sprag brake.

18. The hybrid powertrain according to claim 10, wherein each of the first and second motor/generators employ non-rare earth magnets.

19. The hybrid powertrain according to claim 10, wherein the second motor/generator is configured to generate greater torque and is physically larger than the first motor/generator.

* * * * *